United States Patent Office 2,785,186
Patented Mar. 12, 1957

2,785,186

PREPARATION OF ETHYLENE OXIDE USING ALKYL SILICONES AND SILANES AS CARBON DIOXIDE REPRESSANT

Ralph Landau, East Hills, N. Y., assignor to Chempatents, Inc., New York, N. Y., a corporation of Delaware No Drawing. Application April 10, 1953,
Serial No. 348,121

10 Claims. (Cl. 260—348.5)

This invention relates to processes for the preparation of ethylene oxide by the partial oxidation of ethylene by means of gaseous oxygen in the presence of a silver containing catalyst, and more particularly to such a process wherein a small proportion of a volatile silicon containing compound is provided in the reaction zone to avoid or suppress the excessive formation of carbon dioxide in the process. The invention relates especially to such a process wherein from about 0.5 to 500 p. p. m. (parts per million) of a methyl silicone having a boiling point of about 230° C. is provided, on a mol basis of the gaseous mixture.

The preparation of ethylene oxide by the partial oxidation of ethylene by means of gaseous oxygen in the presence of a sliver containing catalyst is known, and such processes have achieved noteworthy commercial success.

The commercial operation of these processes requires rather careful control in order to avoid undesirable side effects, one of the most important of which is the avoidance of overheating which is associated with excessive formation of carbon dioxide. This results in loss of ethylene feed or ethylene oxide desired product and may even ruin the catalyst. The latter effect might necessitate shutting down the plant and replenishing the catalyst.

A major problem confronting the art is the improvement of the control of the foregoing processes, and especially the avoidance or suppression of excessive formation of carbon dioxide.

It has been found in accordance with the invention that the provision of a small proportion of a volatile silicon containing compound in the reaction zone avoids or suppresses the excessive formation of carbon dioxide in the partial oxidation of ethylene by means of gaseous oxygen in the presence of a silver containing catalyst.

The objects achieved in accordance with the invention as described herein include the provision of a process for suppressing or avoiding excessive formation of carbon dioxide in the partial oxidation of ethylene by means of gaseous oxygen in the presence of a silver containing catalyst, by providing in the reaction zone a small proportion of a volatile silicon containing compound; the provision of such a process wherein the gaseous reaction mixture contains from about 0.5 to 500 p. p. m. of the silicon containing compound; the provision of such a process wherein the silicon containing compound is organic; the provision of such a process wherein the silicon containing compound is an alkyl silicone wherein each alkyl contains from 1 to 5 carbon atoms; the provision of such a process wherein the silicon containing compound is a methyl silicone having a boiling point in the range of about 20 to 400° C.; the provision of such a process wherein the silicon containing compound is a silane; the provision of such a process wherein the silane is an alkyl silane wherein each alkyl contains from 1 to 5 carbon atoms; the provision of such a process wherein the silane is tetramethyl silane; and other objects which will be apparent as details or embodiments of the invention are set forth hereinafter.

In order to facilitate a clear understanding of the invention, the following preferred specific embodiments are described in detail.

Example 1

A vertical stainless steel tubular reactor of about 1" diameter and about 42" in height, surrounded by a temperature regulating liquid bath, such as diphenyl ether, is filled with a silver containing catalyst.

This catalyst is prepared by mixing an aqueous solution of silver nitrate with a slight stoichiometric excess of aqueous sodium hydroxide, settling, and thoroughly washing the silver oxide precipitate. An aqueous solution of barium lactate or calcium lactate is added thereto, to provide about 5 to 6% of barium or calcium relative to the mols of silver therein. Approximately ⅜" spheres of mullite having a roughened outer surface and a substantially non-porous core, and freshly washed with water, are then added to the above mixture. The resulting mixture is evaporated slowly, with slow stirring, until each sphere is well coated with the slurry. Then the coated spheres are dried, e. g., at about 105–110° C. for about 4 to 10 hours, and then roasted at about 330 to 400° C. for about 1 to 5 hours.

A gaseous reaction mixture containing 5% ethylene by volume, 6% oxygen and the remainder inerts, mainly nitrogen, is passed through the tube at about 100 liters per hour (measured at atmospheric pressure and about 27° C.) at a temperature of about 239° C.

Under these conditions there is an excessive formation of carbon dioxide, such that the exit gases from the reactor contain about 2.5% by volume of carbon dioxide. This represents a conversion of about 25% of the ethylene feed to carbon dioxide.

Then, while the gas feed is continued, there is added to the gaseous mixture a methyl silicone having a boiling point of about 230° C. (viscosity of 2 centistokes). The addition rate is 370 p. p. m. on a mol basis of the gaseous mixture for 8 minutes, an interval of 15 minutes with no addition, then the same proportion is added for 2 minutes, then after another interval of 40 minutes with no addition, the same proportion is added for 1 minute. Then the reaction is continued for an additional 2 hours with no addition, and at the end of this period, the carbon dioxide content of the exit gas is 1%. This represents a conversion of 10% of the ethylene feed to carbon dioxide. This is an about 2.5-fold drop or suppression of the formation of carbon dioxide in the reaction system.

In other words, the 15% excess conversion of ethylene to carbon dioxide is completely avoided, in accordance with the invention.

As is evident from the foregoing results, the effect of the additive in the reaction zone endures for a substantial time after cessation of the addition thereof to the gaseous mixture.

Example 2

The initial procedure of Example 1 is repeated, at a temperature of about 220–224° C. using similar but slightly more active catalyst, so that the exit gases contain 3.0% carbon dioxide by volume. This represents a 30% conversion of the ethylene feed to carbon dioxide.

The silicone of Example 1 is then added to the feed gas at the rate of 100 p. p. m., continuously. At the end of 87 minutes the carbon dioxide formation is reduced to 0; i. e., the catalyst becomes substantially inactive.

A similar gaseous mixture except containing ethane in place of the ethylene is passed over the catalyst at a temperature of about 235–240° C. for about 5 minutes, and then the regular gaseous feed as described above is used. At this point, there is an about 20% conversion of ethylene to carbon dioxide, showing that the catalyst is not permanently damaged even by such an excess of the silicone as to render it temporarily inactive; and that the catalyst is easily reactivated.

This result is in marked contrast to the effect caused by reactive chlorinated paraffins, which poison the catalyst, and require a chemical treatment to reactivate the catalyst. Such treatment might require shutting down a plant, and removing the catalyst for such treatment.

*Example 3*

The initial procedure of Example 2 is repeated at a temperature of about 218° C., so that the exit gases contain about 3.0% carbon dioxide. This represents an about 30% conversion of ethylene feed to carbon dioxide.

Then the above described silicone is added in the gaseous reaction mixture continuously at the rate of 100 p. p. m. During this addition, the exit gas contains 0.7% carbon dioxide, which represents a 7% conversion of the ethylene feed to carbon dioxide. This is an about 3-fold decrease in the formation of carbon dioxide, due to the presence of the silicone additive; i. e., avoidance of the 23% excess conversion of ethylene to carbon dioxide.

Simultaneously with the above discussed reductions in the formation of carbon dioxide, there is an increase in the concentration of ethylene oxide in the exit gas, i. e., an improved yield thereof.

*Example 4*

The initial procedure of Example 1 is repeated at a temperature of about 230° C., so that the exit gases contain about 2.49% carbon dioxide. This represents an about 25% conversion of ethylene feed to carbon dioxide.

Then there is added in the gaseous feed mixture tetramethyl silane (Si(CH$_3$)$_4$) continuously at the rate of 110 p. p. m. of the gaseous mixture for 43 minutes. After running an additional 1 hour and raising the temperature to 236° C., the exit gas contains 0.30% carbon dioxide, which represents a 3% conversion of ethylene to carbon dioxide. This is an about 8-fold reduction in the formation of carbon dioxide; i. e., avoidance of the 22% excess conversion of ethylene to carbon dioxide.

At the same time the concentration of ethylene oxide in the exit gas remains constant at about 0.4%, but the ethylene consumed in the formation of this amount of product is reduced from 33.5% down to 13%; an almost 3-fold improvement.

Upon continuing the reaction at a temperature of 245° C., the exit gas contains 0.37% ethylene oxide; and this represents a 60% output of ethylene oxide based upon the ethylene consumed.

Desirable results are achieved with various modifications of the foregoing examples, such as the following. The additive may be any silicon containing compound resistant to oxidation in the system having a sufficient volatility, so that the desired amount thereof may be provided in the reaction zone, e. g. 0.5 to 500 p. p. m. on a mol basis of the gaseous mixture, desirably 50 to 250, and preferably 100 to 200, if fed continuously in the gaseous mixture. However, higher amounts, e. g., up to 3000 p. p. m. may be used if fed intermittently, so that the average amount fed falls within the above ranges. Mixtures thereof may be used. Desirably, the additive should not cause permanent damage to the catalyst.

One series of additives preferred from the economic viewpoint is the alkyl silicone series having the desired volatilities. These may be typified by the methyl silicones having the following structure:

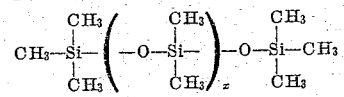

wherein $x$ is an integer, preferably which are fluid at room temperature and boil at 20 to 400° C. Higher boiling members thereof having sufficient volatility to provide the desired amount in the gaseous mixture may be used. The alkyls (illustrated by the methyls in the formula) may contain from 1 to 5 carbon atoms, but from the stability viewpoint the methyl compounds are preferred.

The silanes analogous to the above polysiloxanes and having the indicated volatilities may likewise be used.

The catalyst employed in the foregoing examples is regarded as particularly effective and desirable. Other silver containing catalysts may be used however, such as those known to the art.

The feed gas may be any suitable reaction mixture for preparing the desired ethylene oxide, preferably it may contain from about 3 to about 8% ethylene, 6 to 8% oxygen, and the remainder is inert gas, e. g., up to about 10% carbon dioxide and the remainder nitrogen. Air may be used to provide the oxygen. The reaction may be conducted at temperatures in the range of about 150 to 400° C., preferably about 225 to 300° C. If desired, the reaction may be conducted under pressure, e. g., up to about 25 or more atmospheres. The reaction mixture, temperature, catalyst, and contact time or space velocity of the gaseous mixture are interrelated and suitable combinations thereof are selected to give the desired optimum output and concentration of ethylene oxide in the exit gas.

The conditions described in the above examples represent extremes giving excessive formation of carbon dioxide, in order to point out the marked effect of the provision of the additives of the invention in suppressing or avoiding such excessive formation. The desirable effect is also achieved in connection with the operation of the process under conditions to give the optimum output of ethylene oxide; and the process of the invention is particularly advantageous for rapidly correcting a sudden rise in the reaction temperature, which in turn is associated with a sudden rise in the concentration of carbon dioxide in the exit gases.

Inasmuch as the desired formation of ethylene oxide is only one of the many reactions or effects which may occur upon subjecting the mixture of ethylene and oxygen to contact with the catalyst at elevated temperatures, it has been regarded as convenient to refer to the percentage of ethylene consumed in forming ethylene oxide relative to the feed as "conversion," and the percentage of ethylene oxide formed relative to the ethylene consumed as "selectivity." The yield of ethylene oxide relative to the ethylene feed is the product of the "selectivity" times the "conversion," e. g., on a mol basis. These effects and terms may be represented as follows:

Ethylene plus oxygen gives:
  A. Ethylene oxide (desired)
  B. Carbon dioxide and water (not desired)
  C. Unreacted ethylene plus oxygen (not desired)

Selectivity is:
$$\frac{A}{A+B}$$

Conversion is:
$$\frac{A+B}{A+B+C}$$

Yield is:
$$\frac{A}{A+B+C}$$

The foregoing are indicated as major considerations.

However, it may be noted that the ethylene oxide formed might be rearranged to acetaldehyde, which may be an undesirable side product, or it might be further oxidized; and of course, the ethylene oxide formed can be further oxidized in the system, giving carbon dioxide and water.

It is indeed surprising that the very complicated ethylene oxide formation process may be controlled or regulated in such a convenient manner in accordance with the invention, especially when one keeps in mind the many undesirable effects or side reactions that may occur during or simultaneously with the desired partial oxidation reaction.

In view of the foregoing disclosures, variations and modifications thereof will be apparent to one skilled in the art and it is intended to include within the invention all such variations and modifications except as do not come within the scope of the appended claims.

I claim:

1. In a process for producing ethylene oxide by the partial oxidation of ethylene by means of gaseous oxygen in the presence of a silver-containing catalyst at a temperature range of about 150° C. to 400° C., the improvement which comprises providing in the reaction zone an amount in the range of about 0.5 to 500 p. p. m., based upon the gaseous feed mixture, of a silicon containing compound chosen from the class consisting of alkyl silicones and silanes, said compound having a sufficient volatility to provide said amount thereof at said temperature, whereby excessive formation of carbon dioxide is suppressed.

2. A process of claim 1 wherein the silicon containing compound is a silicone.

3. A process of claim 2 wherein the silicon containing compound is an alkyl silicone having a boiling point in the range of about 20 to 400° C. and wherein each alkyl contains 1 to 5 carbon atoms.

4. A process of claim 3 wherein the alkyl silicone is a methyl silicone.

5. A process of claim 4 wherein the methyl silicone has a viscosity in the range of 1 to 10 centistokes.

6. A process of claim 5 wherein the viscosity of the silicone is 2 centistokes and its boiling point is about 230° C.

7. A process of claim 10 wherein the silicon containing compound is a silane in which each hydrogen is replaced by an alkyl group containing 1 to 5 carbon atoms which silane has a boiling point in the range of about 20° C. to 400° C.

8. A process of claim 7 wherein the alkyl silane is a methyl silane.

9. A process of claim 8 wherein the alkyl silane is tetramethyl silane.

10. A process of claim 1 in which the silicon containing compound is a silane.

References Cited in the file of this patent

UNITED STATES PATENTS

| | | |
|---|---|---|
| 2,270,779 | Berl | Jan. 20, 1942 |
| 2,270,780 | Berl | Jan. 20, 1942 |
| 2,356,476 | Shappirio | Aug. 22, 1944 |
| 2,587,468 | Heider | Feb. 26, 1952 |
| 2,615,900 | Sears | Oct. 28, 1952 |
| 2,653,952 | Egbert | Sept. 29, 1953 |

OTHER REFERENCES

Murray: Australian J. Sci. Res. 3A:445–6 (1950). (Complete article 433–449.)